(No Model.)
G. F. DINSMORE.
TRANSMITTING HEAT.
No. 589,340.
Patented Aug. 31, 1897.
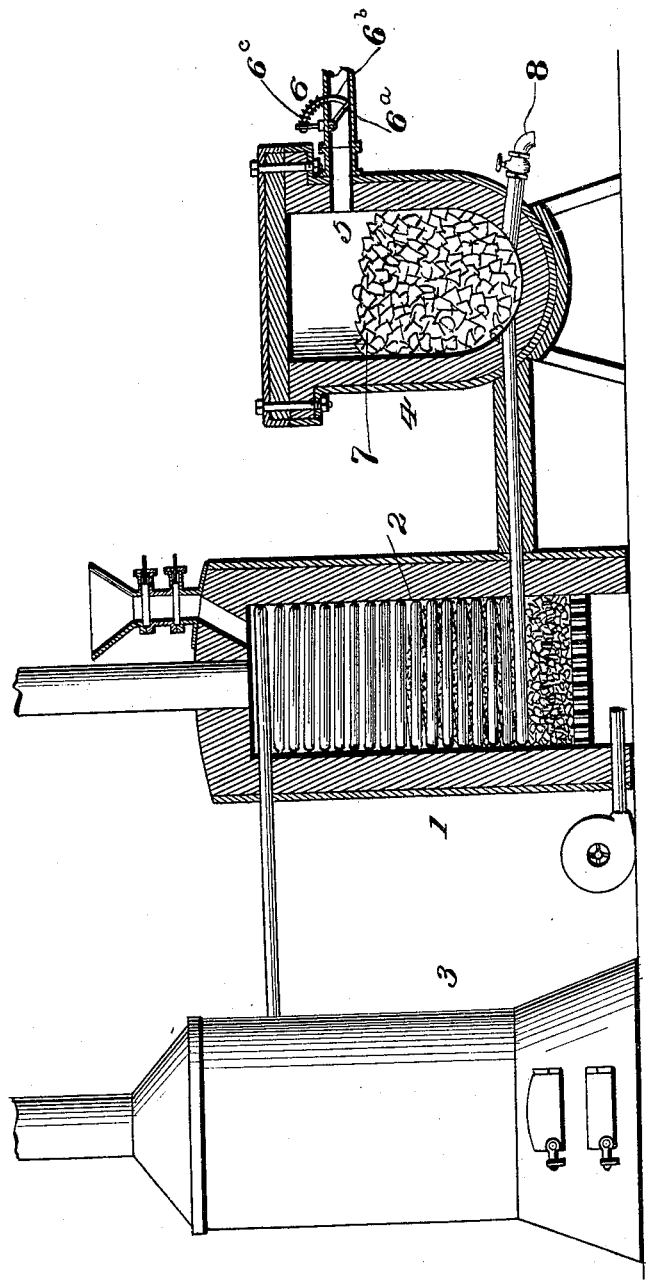
Witnesses
Inventor
George F. Dinsmore
By Francis M. Wright,
Attorney

UNITED STATES PATENT OFFICE.

GEORGE F. DINSMORE, OF BOSTON, MASSACHUSETTS.

TRANSMITTING HEAT.

SPECIFICATION forming part of Letters Patent No. 589,340, dated August 31, 1897.

Application filed June 18, 1897. Serial No. 641,376. (No model.)

*To all whom it may concern:*

Be it known that I, GEORGE F. DINSMORE, a citizen of the United States, residing at Boston, in the county of Suffolk and State of Massachusetts, have invented certain new and useful Improvements in Transmitting Heat, of which the following is a specification.

My invention relates to improvements in the process of and apparatus for transmitting intense heat and especially in applying such heat at a distance from the place of generation to refractory material—such as metals, ores, glass, &c.—to melt or refine the same.

My invention embodies an application of the principle of the conservation of energy for the purpose described and may be explained in general terms as follows:

If heat be applied to a body of gas in a closed vessel, the whole of the heat so applied (neglecting, of course, the loss by radiation) will appear as sensible heat, as indicated by a rise of temperature in the gas. If, however, the vessel were not entirely closed, only a part of the heat applied would appear as sensible heat and part would appear as work done by the gas in expanding against the external pressure.

Suppose the gas were contained in a very long tube, say three hundred feet in length, closed at one end and open at the other, and heat were applied to one foot of the tube at the closed end. This heat would appear partly as an increase of sensible heat in the portion of the gas where the heat was so applied, partly as expansion of such portion of the gas, and work done in imparting motion along the tube to the remainder of the gas therein, due to the expansion of the part of the gas to which heat was applied. Now suppose the tube to be open at both ends and gas to be flowing continuously therethrough at a uniform velocity and that under these conditions heat were continuously applied to the tube at the end at which the gas flows in. In this case the effect of the heat applied would be partly to raise the temperature of the gas and partly to expand the gas and produce an increased velocity in the gas emerging from the tube.

The above results will appear only in a much more marked degree where heat is applied along the whole length of the tube.

If the tube were perfectly straight, so that the only resistance to the passage of the gas therethrough were surface friction, then the amount of sensible heat imparted to the gas would be inconsiderable, and almost all the heat applied would appear as expansion or energy of momentum of the gas.

If the tube has sharp turns offering obstruction to the rapid movement of the gas, then the velocity of the gas is checked, exerting a back pressure on the portion of the column by whose expansion the increased velocity is to be produced, opposing such expansion, and thereby necessitating that the heat applied be taken up as sensible heat in a correspondingly greater proportion. In order then that the heat may be taken up by the gas as little as possible in the form of sensible heat and as much as possible in other forms of energy, it is necessary that the tube should have as few sharp turns as possible. A perfectly straight tube is not practicable, but a coil in the form of a circular helix will give the best results practically attainable.

It is to be observed that the velocity of the gas in passing through a long tube heated throughout its length is very greatly increased. At each of its positions in the tube it receives an additional momentum due to the expansion of the column of gas behind it. As this column becomes longer the nearer the gas approaches the end of the tube it is easy to see that the additional velocity given to the gas at the end of the tube is very great, this being due to the expansion of a very long column behind it.

By permitting the gas from the heated tube to be discharged into a vessel maintained, as by a pressure-valve, at almost the same pressure as that at which it is forced into the tube, so that the gas that has been expanded by the heat is brought to nearly its former condition as regards density, I can recover in the form of sensible heat a large part of the heat applied to the gas in a form other than sensible heat.

Some of the energy recovered as sensible heat will be so converted by the impact of the gas against the pieces of refractory material in the vessel, and some will be further recovered by the impact of the gas against the gas filling the vessel, which gas will have comparatively little motion. It is because the gas emerging from the pipe into the vessel enters the latter at an extremely high velocity that it can overcome the resistance or back pressure of the gas in the vessel even though the latter be more dense and at higher pressure than the entering gas. The molecules of the entering gas, though more widely separated, will penetrate and enter between the molecules of the gas in the vessel, because the latter molecules are moving indiscriminately in all directions and cannot offer sufficient resistance to the momentum of the entering gas, whose motion has become to a great extent uniform in direction.

In the drawing then let 1 represent a furnace lined with refractory material, as fireclay, so that intense heat can be maintained therein; 2, a coil of pipe in said furnace; 3, a steam-boiler for introducing steam at pressure into said coil; 4, a crucible into which said coil discharges; 5, an outlet from said crucible, and 6 a pressure-valve in said outlet, comprising a pivoted gate $6^a$, a guide-rod $6^b$, and a spring $6^c$; 7, the refractory material in the crucible, and 8 a tap therefrom. It is evident that if the pressure maintained in the crucible and opposing the escape of the gas, as would be caused by the resistance of the pieces of refractory material in the crucible, be nearly but not quite as great as that from the boiler into the pipe nearly the whole of the heat taken up by the gas in its passage through the furnace can be recovered as sensible heat in the crucible. The intensity of the heat in the crucible being therefore dependent upon the amount taken up from the furnace, I have next to consider what are the conditions under which a maximum amount of heat can be taken up by the gas.

The first condition is that the coil should be sufficiently long to take up substantially the whole of the heat of combustion in the furnace—that is, all that can be abstracted—while maintaining continuous combustion therein.

A practical limit to the length of the tube used is determined by the liability of the end of the coil to melt or burn off under the intense heat of the furnace. This is prevented by the passage of the gas along the coil, which abstracts the heat as fast as it is passed into the walls of the tube. This abstraction of heat will take place the more rapidly the greater is the difference between the temperature of the furnace at the outer surface of the tube and the temperature of the gas at the inner surface thereof. Hence it is important to keep down the temperature of the gas passed along the tube.

The first rule to be observed, then, is to so construct the coil that the gas may have the greatest possible freedom in passing along the tube, so that the heat applied may be taken up as much as possible as expansion or energy of momentum and as little as possible as sensible heat. Hence for practical purposes a coil in the form of a circular helix is the most effective. Next it is to be observed that gas at any certain temperature passing along the tube will the more rapidly abstract the heat the greater is its velocity along the tube. Hence a second rule to be observed is that a high initial velocity should be given to the gas entering the tube. Next it is of importance that the pipe should be of narrow diameter. Gases being comparatively bad conductors of heat, it is only the thin peripheral film of the gas that is immediately in contact with the iron coil that makes up the heat. The size of this varies directly with the diameter of the coil, but the amount of gas to be heated thereby varies as the square of the diameter. Hence the smaller the diameter the more rapid is the expansion of the gas, and therefore the more rapid is the abstraction of the heat due to the passage of the gas along the tube.

A tube about two hundred and thirty-six feet long by three-fourths of an inch internal diameter in a coil of eighteen turns arranged vertically in a furnace of convenient size to receive the same, with an initial steam pressure of one hundred pounds, the heat applied being that produced by the combustion of coke under a forced draft, will be found to give good results, and the end of such a coil will not melt or burn off. The above dimensions may, however, be varied substantially in the manner I have indicated without departing from the spirit of my invention.

While I have spoken of steam as the gas to be preferably employed, my invention is not limited to the use of steam, but any gas chemically suitable for the purpose desired may be used.

I claim—

1. The process which consists in heating and setting in rapid motion a long narrow stream of gas through a passage free from obstructions, simultaneously applying heat to, and at various points along, said stream, the length, thickness and velocity of the stream being maintained at such magnitudes, substantially as described, that the greatest attainable part of the heat applied thereto is utilized solely in causing expansion of the gas and a consequent acceleration in its velocity, then compressing said gas under such conditions that the energy represented by the velocity of the stream is converted into sensible heat and added to the sensible heat already in said gas, and employing said heat to intensely heat any desired material, as a difficultly-fusible material, substantially as described.

2. The process which consists in heating and setting in rapid motion a long narrow stream of gas through a passage free from obstructions, simultaneously applying heat to, and at various points along, said stream, the length, thickness and velocity of the stream being maintained at such magnitudes, substantially as described, that the greatest attainable part of the heat applied thereto is utilized solely in causing expansion of the gas and a consequent acceleration in its velocity and then directing said stream of gas against difficultly-fusible material and compressing the gas, whereby the energy represented by the velocity of the stream is converted into sensible heat which, added to the sensible heat already in the gas, serves to fuse or refine said material, substantially as described.

3. The combination of a furnace, a continuous pipe therein, means for supplying steam at about one hundred pounds pressure to said pipe, and a vessel into which said pipe discharges, provided with means to cause compression of the steam discharged thereinto, whereby the latent heat of said steam will be converted into sensible heat, the diameter of the pipe being about three-fourths of an inch internally and the length of the pipe being about two hundred and thirty-six feet, substantially as described.

In witness whereof I have hereunto set my hand in the presence of two witnesses.

GEORGE F. DINSMORE.

Witnesses:
JOHN PAYNE,
HENRY A. LOTHROP.